United States Patent [19]

Hänel et al.

[11] Patent Number: 5,809,241
[45] Date of Patent: Sep. 15, 1998

[54] SYSTEM AND METHOD FOR PROCESSING LONG MESSAGES IN A CHIP CARD

[75] Inventors: Walter Hänel, Holzgerlingen; Martin Witzel, Schönaich, both of Germany

[73] Assignee: International Business Machines Corporation, Armonk, N.Y.

[21] Appl. No.: 809,149
[22] PCT Filed: Jul. 5, 1995
[86] PCT No.: PCT/EP95/02606
 § 371 Date: Mar. 5, 1997
 § 102(e) Date: Mar. 5, 1997
[87] PCT Pub. No.: WO97/02543
 PCT Pub. Date: Jan. 23, 1997
[51] Int. Cl.[6] .................................................. G06F 17/00
[52] U.S. Cl. ...................................................... 395/200.36
[58] Field of Search .................... 395/200.36; 235/38 R, 235/380

[56] References Cited

U.S. PATENT DOCUMENTS 5,390,199  2/1995  Krajewshi, Jr. et al. ................. 380/25
5,629,508  5/1997  Findley, Jr. et al. ................. 235/38 R Primary Examiner—Ellis B. Ramirez
Attorney, Agent, or Firm—Kenneth A. Seaman

[57] ABSTRACT

The invention relates to communication with smart cards. Communication of any desired device with a smart card is effected by sending a message to the smart card through the device, receipt of the message by the smart card and processing of the message in accordance with one of the processes in accordance with the invention. A message arriving in a smart card is written and stored by a processor unit in a writable, non-volatile memory, such as an EEPROM, before the message is checked for authorization on the smart card by the processor unit.

21 Claims, 4 Drawing Sheets

SYSTEM AND METHOD FOR PROCESSING LONG MESSAGES IN A CHIP CARD

SCOPE OF THE INVENTION

The invention relates to a method and device for processing messages in a chip card with a processor unit and a writable, non-volatile memory, where an access authorization for a message on the chip card has to be checked before further processing. The invention also relates to a method for communicating with the chip card.

STATE OF THE ART

Data-carrying cards or chip cards are terms currently used to mean portable cards, generally in roughly the form of a cheque card and preferably made of plastic or metal and having an electronic chip integrated therein. In contrast to simple storage cards (known as chip-cards or memory cards) intelligent data-carrying cards or processor cards (also called multi-functional chip cards or smart cards) also have a processor to control the data stored on the data-carrying card, in addition to a memory storage region. This allows better protection of the data and leads to an improved functionality of the chip card. Simple memory cards generally only permit writing and reading of the data. In addition, smart cards also have access to functions for the structuring, localising, handling and protection of the data.

The increasing use of smart cards, resulting in particular from the increased protection against tampering, extends to a number of applications. Applications with smart cards, and hence applications for which communication is required between the smart card and any desired device, may, for example, be cashless payments, identification of the owner of the smart card, storage of data and the like.

In order to prevent unauthorised access to the data on the smart card, the appropriate access authorization must first be demonstrated prior to access to the data. Methods for checking access authorization may, for example, be an authentification, for example, through a MAC (Message Authentification Code) or an identification number (PIN—Personal Identification Number), or data encryption. The authorization must be verified before the data can be effectively overwritten. The authentification provides a means by which the authenticity of subjects and objects can be established. Generally a symmetrical encryption algorithm, such as DES (Digital Encryption Standard), or an asymmetrical encryption algorithm, such as, for example, a Public Key Algorithm, is employed.

FIG. 1 shows the diagrammatic structure of a smart card 10. The smart card 10 communicates with the outside world, represented here by any desired device 15, which may, for example, be a card reader, a computer or the like, through an I/O port 20, which is connected to a processor unit 30. The I/O port 20 forms the interface to the outside world of the smart card 10 and conducts the messages or other information captured from the outside world to the processor unit 30. Messages or data from the smart card 10 can also be retransmitted to the outside world through the I/O port 20.

The processor unit 30 is connected with a volatile, writable memory 40, a non-volatile, read-only memory 50 or a similarly non-volatile but writable memory 60. The volatile memory 40 is generally implemented as RAM (Random Access Memory) in current smart cards and is also hereinafter referred to as RAM 40. The read-only, non-volatile memory 50 is preferably implemented as ROM (Read-Only Memory) -in current smartcards and is hereinafter referred to as ROM 50. Correspondingly, a PROM (Programmable Read Only Memory) or the like may be used. The non-volatile but writable memory 60 is preferably implemented in the smart card 10 as EEPROM (Electrically Erasable Programmable Read Only Memory) and will be described below as EEPROM 60.

Volatile storage, such as the RAM 40, differs from non-volatile, such as the ROM 50 or the EEPROM 60 in that, in the case of the volatile memory, the memory contents are lost when the power supply is removed, while the memory contents in the non-volatile memory are retained, even after removal of the power supply. Read-only memory, such as the ROM 50, contains a fixed program (e.g. burnt in) which cannot be changed. Writable memory, such as the RAM 40 or the EEPROM 60, may have their memory contents altered by write functions, where the number of possible write functions is generally limited by their working life. Volatile memory generally has a much shorter access time (by a factor of 1:10,000) than non-volatile memory and for this reason is preferably used as a fast working storage for the processor unit 30.

An operating system 55 for the smart card 10 is also preferably stored as a fixed program in the ROM 50 area. The operating system 55 can also, however, be held, at least partially, in the EEPROM 60 and contains programs for the smart card 10, which control and monitor the implementation of programs and runs, the distribution of operating means to the individual user programs and the maintenance of the mode of operation in the smart card 10. The storage region in the RAM 40 is divided during operation of the smart card 10 into a region 70 used as buffer memory by the operating system 55 of the processor unit 30 and a region 80 which can be used for the operation of the programs.

Data may be stored in the EEPROM 60 by the processor unit 30 or be read from it. For this purpose the EEPROM 60 generally has a region 90 with a file system and a region 100 without a file system. The region 90 with the file system has a plurality of files 110, preferably arranged in a-tree structure. The files 110 are accessible through a root directory 120, which preferably also shows a directory of the contents of the stored files 110. The data width of the individual files 110 can be freely defined on storing the file through the processor unit 30, within the framework of the overall length of the EEPROM 60. In addition, access conditions to any individual file 110, such as, for example, read only or write only or combined read/write access, can be defined. Thus, a write access to one of the files 110 can be secured by means of an authentification procedure (hereinafter further defined) such as, for example, by means of a check sum in using a MAC. In which file or files of a plurality of files 110 a message is to be stored or to which of the files a message shall have access, is either present as information in the message itself or the processor unit 30 knows, e.g. on the basis of previous messages, the corresponding location. A message can, in this connection, be any, preferably closed, information unit, which is transported from a data source to a data sink, here the smart card 10.

Each of the files 110 is again subdivided into a plurality of separate records, which are related through a processing technology. The data records form a logical unit within a file and should preferably only be written or read as a whole. The region 100 without a file system is intended for storing permanent data of the operating system 55 and is random access.

If the smart card 10 receives a message from the outside world through the I/O port 20, this is first written to region 80 of the RAM 40 before further processing by the processor unit 30. To authenticate the message and hence for checking the allowability of access to the smart card 10, the message preferably contains an addition which verifies that the message comes from a particular address and has not been altered on the way from this address to the smart card. Currently, the MAC, which contains a checksum, in order to verify and monitor the authorization, e.g. for a write or read access, is preferably used as such an addition. Other authentification methods, such as, for example, those mentioned above, may be similarly used.

Only when the access authorization has been checked and positively confirmed by the processor unit 30 can the message be further processed, in that, for example, it is copied or moved from the RAM 40 into the EEPROM 60 by the processor unit 30. In this process it is to be understood that each individual message to be found in the smart card 10 must be checked for authorization, before it can be further processed. However, the message must generally be present in its entirety since, as in the use of the MAC, the authorization, such as the method of authentification, can only be checked when the full message, i.e. the complete message data record, is available.

Since the storage region of the RAM 40 is generally very small (for example, 240 bytes) and is further reduced by the region 70 employed by the operating system 55, only a limited storage region (for example, about 64 bytes) remains in region 80 for the acceptance of messages. Correspondingly, messages which are to be processed by processor cards 10 must not exceed a fixed maximal data size (in the present instance 64 bytes). Longer messages must be broken down into smaller ones, leading to a lengthening of the communication time in view of the special security provisions and the associated methods for determining the authorization in communicating with the smart card 10.

An example of a possible transfer of a message between the outside world and the smart card 10 could be the following message: "Write into data record No. Y in file No. X the data DATA, where the authorization is a MAC of Z". Here, DATA stands for any desired sequence of data. A key is provided in the EEPROM 60 of the smart card 10 which, together with the data DATA permits the MAC to be checked, for example, in accordance with ANSI X9.9 or ANSI X9.19. The processor unit 30 first writes the message into region 80 of the RAM 40 and, after complete receipt of the message, checks the authorization for a write process, using the MAC Z and the data DATA. If there is no authorization or if the authorization conditions are not met, for example, on the grounds of a transmission error, termination is effected by the operating system 55 of the smart card 10. If an authorization for the writing of the message to the smart card 10 can be verified, however, the message is written by the processor unit 30 into a file 130 provided for this write access from the plurality of files 110, where the writing can be effected either as new writing or as overwriting of data in the file 130. After a successful write process, this is communicated by the processor unit 30 as a reply to the outside world with the aid of the I/O port 20. The whole run complies with the definitions in accordance with ISO/IEC 7816.

One problem in this communication between the outside world and the smart card 10 is that it may not be possible to input the whole message because of the limited data space in the RAM 40 and another is that an authorization must first be verified before a write access can or must be effected.

SUMMARY OF THE INVENTION

The object of the invention is to enable a communication with a smart card as far as possible independent of the data size of the message to be received by the smart card. The object of the invention is achieved in accordance with the independent claims.

In accordance with the invention, a message arriving in a smart card is written and stored by a processor unit in a writable, non-volatile memory, such as an EEPROM, before the message is checked by the processor unit for authorization on the smart card. Since the storage space in the writable, non-volatile memory can be freely defined within the framework of the overall data size of the non-volatile memory, messages with almost any desired size of data can be checked for authorization by the smart card and hence processed. Accordingly, the messages received by the smart card from the outside world can be stored either directly in non-volatile memory or only indirectly, e.g. after the message has first been stored temporarily in a writable, volatile memory and possibly also pre-processed. Pre-processing can here be, for example, a determination of the address of the storage location in which the message is to be processed. Since the authorization for a write process into the writable, non-volatile memory must first be verified before further processing of the message, the storage in the writable, non-volatile memory is effected as an interim storage, while the final position has not been established.

The invention finds application in communication with smart cards. The communication of any device with a smart card is effected by sending a message to the smart card through the device, the receipt of the message by the smart card and a processing of the message in accordance with a method in accordance with the invention.

The instructions for processing in accordance with the invention are preferably stored in the operating system of the smart card.

Further advantageous embodiments of the invention are to be found in the sub-claims.

DESCRIPTION OF THE DRAWINGS

For further explanation of the invention the following exemplary implementations are described with reference to the drawings. Components with the same functionality are allocated the same reference numbers.

DESCRIPTION OF THE INVENTION

To simplify understanding of the invention, the writable, volatile memory 40 will again be referred to as RAM 40 and the writable non-volatile memory 60 again as EEPROM 60. However, the invention is not limited to these embodiments of the memory.

Figure 1:
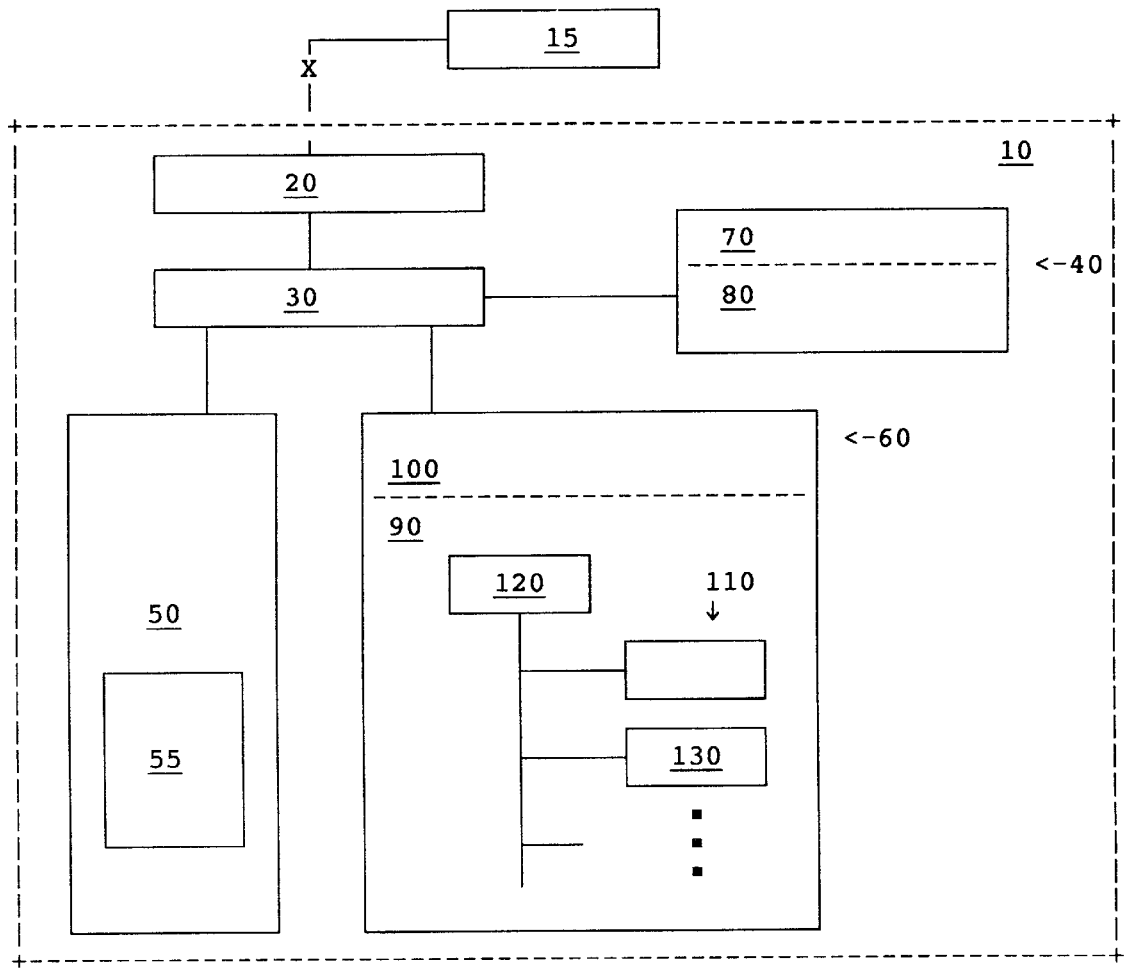
FIG. 1 shows the diagrammatic construction of a smart card.
Figure 2:
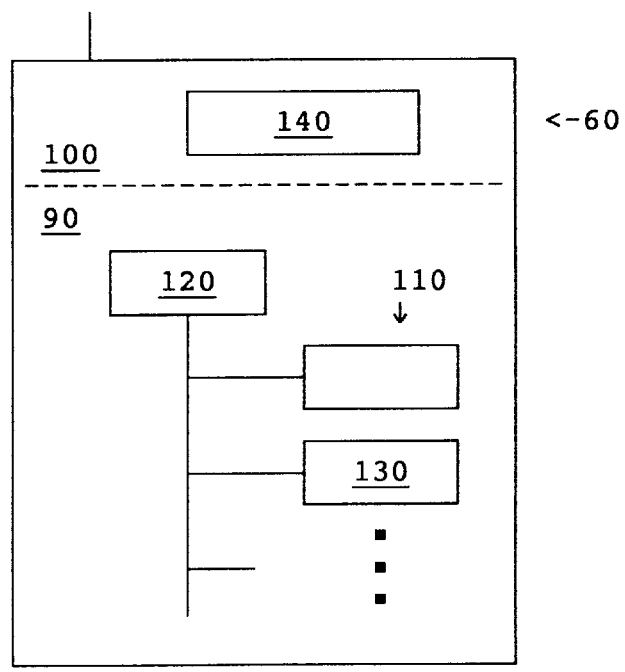
FIGS. 2–4 show embodiments of the invention.

In a first embodiment (FIG. 2) the storage of the-incoming message is effected in an interim storage 140 in the region 100 of the EEPROM 60 which is outside the region 90 with the file systems. After successful storage of the message in the interim storage 140 the processor unit 30 checks the authorization of the temporarily stored message, for example, by recalculating the MAC. If there is no authorization the message processing is terminated and the temporarily stored message can be overwritten by another. However, if it is possible to verify authorization, the message is copied or moved from the interim storage 140 into the file 130 of the plurality of files 110 provided for the storage of the message. After successful storage of the message in the file 130 a corresponding reply is sent to the above.

In this first embodiment, the majority of the writable non-volatile memories currently used, such as the EEPROM 60, ensure that the intermediate storage region 140, for example, after a predetermined number of successful write cycles (about 10,000–100,000), will write to another location of the region 100, since these writable, non-volatile memory elements only permit a limited number of write accesses to a memory location and consequently there can be a loss of data on reaching the end of its life.

It should also be taken into account, in this first embodiment that the action of copying the message from the interim storage 140 to the final location of the message in the file 130 is relatively time-consuming (by a factor of about 10,000) in the memory currently used, compared with other operations, such as writing to or reading from RAM 40 or reading from EEPROM 60. Consequently, preferably only those messages which cannot be read directly into RAM 40 because of their data size, should be stored temporarily in interim storage 140. This can be achieved, for example, by the processor unit 30 first (sequentially) writing the incoming message into RAM 40. If the amount of storage space available in RAM 40 is exceeded, the part of the message stored there is copied to the interim storage 140 and the remainder of the message then stored directly in the interim storage 140 and, if necessary, appended to the part of the message copied from the RAM 40.

Figure 3:
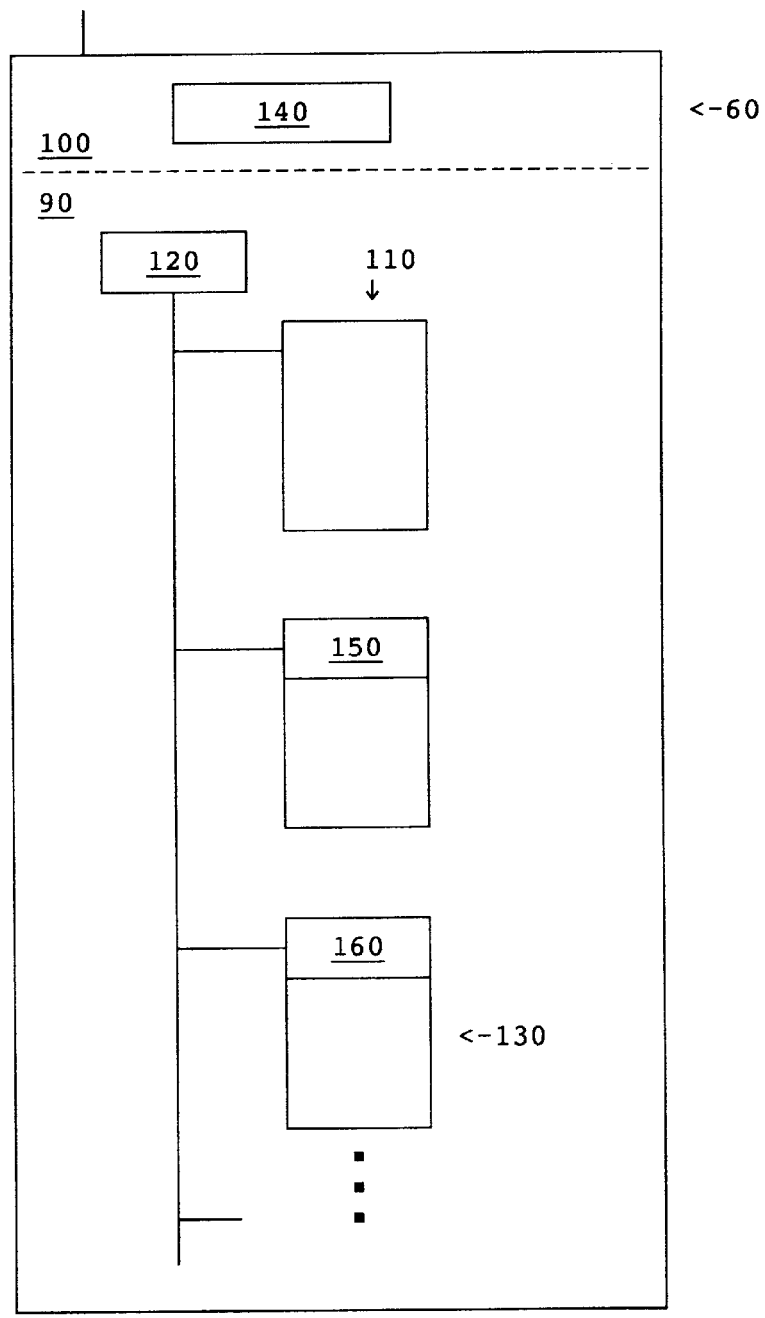

FIG. 3 shows a second embodiment of the invention. Those files from the plurality of files 110, the data record lengths of which exceed the size of the region 70 used as buffer memory, or which are expected to exceed it, now indicate a local interim memory 150, 160, etc. If the address of the file 130, in which the incoming message is to be stored, is already established, the incoming message is stored directly in the interim storage 160 of file 130. The checking of the authorization of the message is now carried out by the processor unit 30 as hereinbefore described, with the message stored in the local interim storage 160. If the address of the file 130 in which the message is to be stored is not known when the message is received, the message is first read into RAM 40. Reading in continues until the address is established. In the case of communication protocols currently used, it is laid down that the address for storage of a message, for example, is to be found within the first 4 bytes of the message, if an address is present.

Correspondingly, the part of the message necessary for the recognition of the address could also be written first into the interim memory 140 optional for the second embodiment.

In the case of currently available writable, non-volatile memory 60, a write access, as mentioned above, is very much slower than a write access to a volatile memory 40. However, if the current communication protocol for communicating with the smart card 10 requires a particular write speed for reading in the message or for the associated parts of a message, the fixed write access times may not be exceeded, at least for the associated parts of the message. Otherwise communication with the smart card 10 will be terminated. Since the minimal possible write access speed required for this cannot be achieved by the majority of the writable, non-volatile memories 60 currently available and is in some cases substantially less, the messages cannot here be written directly to the writable, non-volatile memory 60. In order to be able to carry out communication subsequently, the associated components of the message are first read into the volatile memory 40 and copied from there into the interim storage 140 or the local interim storage 150, 160, etc.

The device and the method in accordance with the second embodiment thus reduce the danger of overusing only one region, such as, for example the interim storage 140, with an approximately equal frequency of access to individual files 110. This is of particular advantage in the use of multifunctional smart cards with a plurality of different applications, where each application is stored in at least one file. If the local interim storage 150, 160 of one of the applications of the multifunctional smart card is destroyed, e.g. by reaching the end of the life of one of the storage cells, other applications will not be affected by this and can continue to be used.

Figure 4:
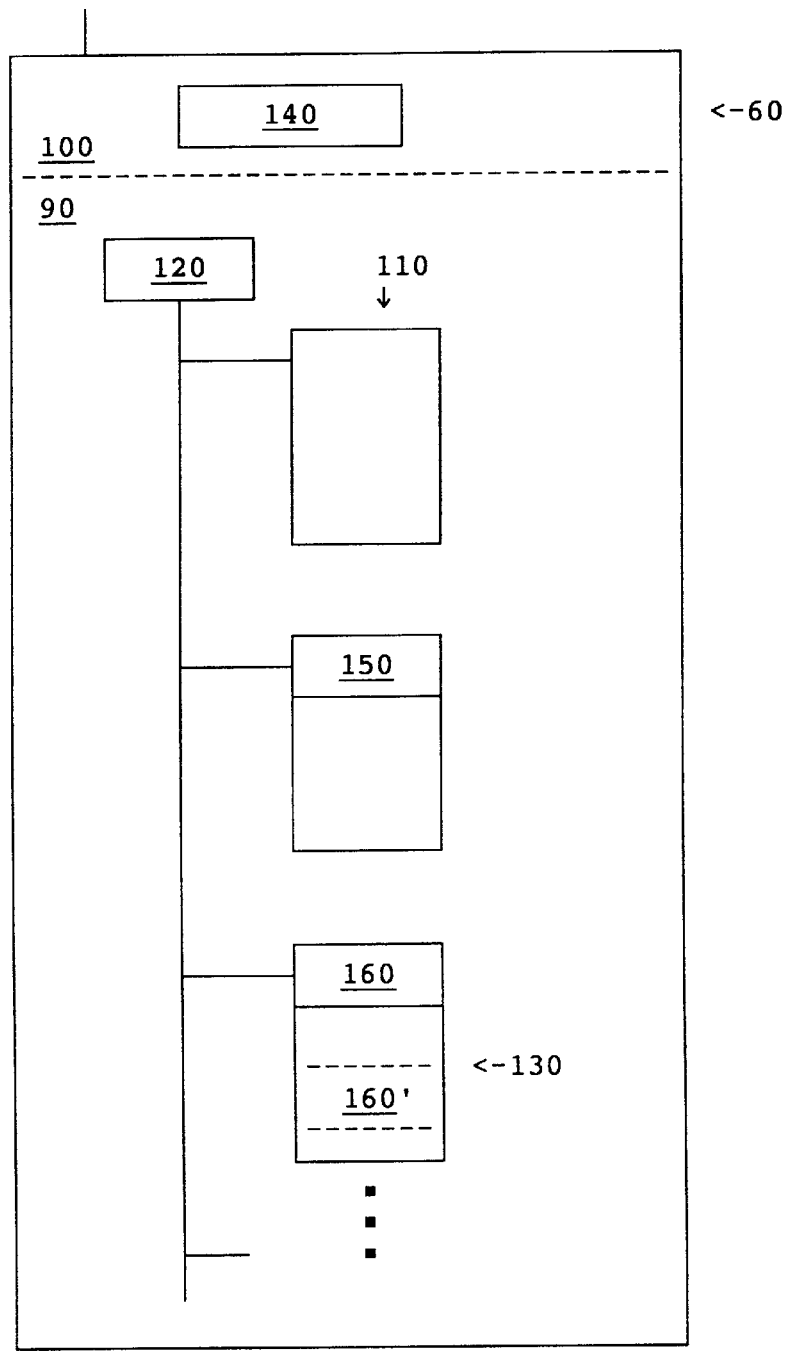

In a third embodiment the corresponding local interim storage 160 itself is defined as file 130 or as a part region thereof and not the content of the current local interim stores 150, 160, etc. after establishing the authorization copied or moved to the corresponding location within the file 130. If the file 130, for example, is input as a linked list, the pointers, which define the location of the individual data records, are correspondingly exchanged within this list. However, if the data record is present in such a form that it is provided with a data record number, it is only necessary to exchange the data record numbers correspondingly. In other words, in this third embodiment the regions of the individual local interim memories are arranged in the corresponding file of the plurality of files 110 and another location of the corresponding file defined as a new interim storage location. FIG. 4 shows such an arrangement. In the local interim memories 160 of file 130 the message is first written and, after successful authentification, authorization of the message is established. The old local interim storage 160 is now integrated into the file 160 and a new region 160' of the file 130 defined as the new local storage 160' of the file 130.

The third embodiment with a redefinition and integration of the current local interim storage in the corresponding file permits a sometimes drastic reduction of write access time compared with the complete recopying of the entire message or of parts of it from one of the interim storage regions into the corresponding position of the file. For example, for a message with a data size of 100 bytes and an access speed of 10 ms for 4 bytes, a write access time of 100 bytes×10 ms/4 byte=250 ms will be required for writing data into the EEPROM 60. In the case where only the pointers need to be exchanged, a further 10 ms write access time per pointer, namely a total of a further 20 ms, will be required for the relocation of the pointers in the linked list, with a pointer length of about 4 bytes. Correspondingly, for the case where the data record number needs to be exchanged and each data record number has a length of about 4 bytes, 2 write accesses likewise totalling 20 ms will be required.

The conventional checking of the authorization of a message in the RAM 40 and a subsequent storage in the EEPROM 60 requires at least one write process of the total message into the RAM 40 and one write process of the data to be stored in the EEPROM 60. In contrast, the checking in accordance with the invention of the authorization corresponding to the first and second embodiments requires at least one write process of the whole message into the EEPROM 60 and a further write process of the data to be stored likewise into the EEPROM 60. The checking of the authorization corresponding to third embodiment likewise requires at least one write process of the entire message into the EEPROM 60 but the second write process into the EEPROM 60 is limited to the data required to redefine the data records.

In the case of the memories currently available, the write process to EEPROM is about 10,000 time slower than that of the write process to RAM, so that the write process into the EEPROM 60 essentially determines the overall write time. However, in the communication account must also be taken of the times for making the connection and authentification and verification of each individual message. If, as in the conventional checking of authorization with long messages, a message has to be broken down into a plurality of part messages, this time for the making of the connection, authentication, security checking, etc., will apply to each individual part message and must be included in the communication time. Without taking into account the time for making the connection, the overall write time is doubled with the current memories in the case of the first and second embodiments compared with the conventional checking of the authorization exclusively in the RAM 40. In the third embodiment, on the other hand, the total write time increases by only a few percentage points, depending on the ratio of the data length required for renaming to the message size. In relation to the overall communication time (times for making the connection+overall write time) for checking the authorization of a message, however, these values appear much more favourable for the embodiments, the longer the messages. In particular, the third embodiment here appears to be particularly favourable.

The different methods of checking authorization will be made clear by way of an example: a 100 byte long message is to be processed in a smart card with a write access speed of 10 ms per 4 bytes for writing the data into the EEPROM 60 and 1 $\mu$s per 4 bytes for writing the data into the RAM 40. Since the times required for writing the data into the RAM 40 make no significant contribution to the overall write time, for the message, the here superfluous calculation can be eliminated. 4 bytes are necessary for recognising the data record and the overall message should be stored in the EEPROM 60.

a) The conventional checking of the authorization of the message, used in such a way, would require about 250 ms total access time.

b) For the first and second embodiment of the invention about 2×250 ms=500 ms total access time would be required for checking the authorization of the message.

c) For the third embodiment of the invention, on the other hand, only about 250+2×10 ms=270 ms total access time is required for verifying the authorization of the message.

In the case of the third embodiment this is an addition to the requisite access time of only 8% compared with the theoretical time for conventional verification of authorization which, however, frequently cannot be used in the case of long messages, although messages of almost any desired length can be completely processed in the EEPROM 60. On the other hand, treatment in accordance with the invention reduces the overall processing time for long messages, since these can be processed as a whole and do not have to be broken down into parts.

It should be understood that in the case of all embodiments, the incoming messages do not have to be written directly into the writable, non-volatile memory 60. For many applications it is more sensible or may even be necessary (see above) to read the message or also even parts thereof, into the volatile memory 40 and from there copied or moved into the corresponding interim storage, such as interim storage 140 or the local interim storage 150, 160, etc. Associated parts of the message should preferably always be stored either directly in the writable, nonvolatile memory 60 or stored temporarily in the volatile memory 40 or the writable, non-volatile memory 60. Preferably, before the start of a communication the smart card 10 will make inquiry, e.g. in accordance with ISO/IEC 7816-3, on the breakdown of the message into individual part messages, where the smart card 10 advises the maximum storage space available in 'the volatile memory 40, or uses a standardised value. Since the write access to an EEPROM is about 10,000 times slower in the currently available memories than the write access to RAM, a temporary intermediate storage in the RAM 40 plays only a minor role.

The processing in accordance with the invention is generally directed and controlled by the operating system 55 of the smart card 10. The operating system 55 preferably includes all the instructions necessary for carrying the invention into effect, for example, in the form of microcode or the like.

SUMMARY

In accordance with the invention a message arriving in a smart card 10 is written and stored by a processor unit 30 in a writable, non-volatile memory 60, such as an EEPROM 60, before the message is checked for authorization on the smart card 10 by the processor unit 30. Since storage locations in the writable nonvolatile memory 60 are freely definable in terms of their data lengths within the framework of the overall data length of the writable non-volatile memory 60, messages with any desired data length can be checked for authorization by the smart card 10 and hence processed. Accordingly, the messages arriving at the smart card 10 from the outside world can be stored directly in the writable non-volatile memory 60 or only indirectly, for example, after the messages have previously been stored temporarily in the writable non-volatile memory 40 and, if necessary, also preprocessed. A preprocessing can here, for example, be determining the address of the storage location, in which the message is to be processed. Since the authorization for a write process in the writable, non-volatile memory 60 must still be verified before any further processing of the message, the storage in the writable non-volatile memory 60 is effected as interim storage, where-the final location has not yet been established.

The invention finds application in communication with smart cards. Communication of any desired device with a smart card is effected by sending a message to the smart card through the device, receipt of the message by the smart card 10 and processing of the message in accordance with one of the processes in accordance with the invention.

We claim:

1. Method for processing a long message in a smart card with a processor unit and a writable, non-volatile memory, where authorization of the message to the smart card is verified before further processing of the message, comprising:

storing the message in the writable non-volatile memory before the authorization is verified.

2. Method as described in claim 1, further comprising:

storing the message going to the smart card in the writable non-volatile memory either directly or indirectly, where the indirect storage is effected in the form of an interim storage and a final memory address has not been established.

3. Method as described in claim 1, comprising:

temporarily storing the message or part thereof, in a writable volatile memory prior to verification in the writable non-volatile memory.

4. Method as described in claim 3, comprising:

preprocessing the message in the writable, volatile memory, e.g. at a storage address, prior to verification in the writable non-volatile memory.

5. Method as described in claim 1, comprising the steps of:

temporarily storing the message in an interim memory in a region of the writable non-volatile memory located outside a region with a file system;

verifying by the processor unit the authorization of the temporarily stored message after successfully storing the message in the interim memory; and with a valid authorization, copying or moving the message from the interim memory into a file of a plurality of files intended for the storage of the message.

6. Method as described in claim 5, further comprising:

replacing, by another place in the region, the memory location reserved for the interim storage after a predetermined number of successful write cycles.

7. Method as described in claim 5, further comprising:

temporarily storing in the interim memory only those messages which cannot by reason of their data length be stored directly in the writable volatile memory.

8. Method as described in claim 5, further comprising the steps of:

first storing the incoming message from the processor unit in the writable volatile memory;

on exceeding the amount of writable volatile memory available, copying to the interim storage the part of the message stored in the writable volatile memory; and now storing the remainder of the message directly in the interim storage.

9. Method as described in claim 1, comprising the steps of:

where a local interim storage is provided in the smart card for those files of the plurality of files the data record length of which exceeds the size of a buffer memory of the writable volatile memory or is expected to do so;

directly storing in the local interim memory of the file, on establishing the address of a file in which the incoming message is to be stored; and carrying out by the processor unit in the local interim storage the checking of the authorization of the message.

10. Method as described in claim 1, comprising:

first reading the message into the writable volatile memory if the address of the file in which the message is to be stored is not yet known when the message is entered; and continuing for at least until the address is established.

11. Method as described in claim 5, comprising:

first reading into the volatile storage parts of the message; and copying from there into the appropriate interim storage.

12. Method as described in claim 9, comprising:

arranging the region of the local interim storage in the corresponding file of the plurality of files after a successful write access, and defining the new local interim storage.

13. Method as described in claim 9, comprising:

defining the relevant local interim memory as file or as a part region thereof, after the authorization has been established.

14. Method as described in claim 12, comprising the steps of:

storing the file as a linked list with pointers which define the locations of the data records;

redefining the current local interim storage as a file, or as a part region thereof; and exchanging the pointers in the list accordingly.

15. Method as described in claim 12, further comprising the steps of:

providing data records present in such a way with data record numbers;

redefining the current local interim storage as a file; and exchanging data record numbers accordingly.

16. Method as described in claim 9, comprising:

first writing the message into the local interim storage of the file after successful authentication of authorization of the message has been effected;

incorporating the old local interim storage into the file; and defining a new region of the file as the new local interim storage of the file.

17. Method as described in claim 5, comprising:

first reading the message or also only parts thereof into volatile storage; and copying or moving from there into the appropriate interim storage.

18. Method as described in claim 1, comprising:

storing directly the associated parts of the message in the writable non-volatile memory or temporarily stored either in volatile memory or in the writable non-volatile memory.

19. Method for communication of a device with a smart card comprising the steps of:

sending a message to the smart card through the device;

capturing the message by the smart card; and processing the message by the method of claim 1.

20. In a smart card with a processor unit, a writable volatile memory with a buffer memory and a writable, non-volatile memory with a plurality of files where:

authorization of a message is verified on the smart card before further treatment of the message, the improvement comprising:

a local interim memory in the processor unit, in the smart card for those files of the plurality of files which have data record lengths which exceed or are expected to exceed the size of the buffer memory.

21. In a smart card with a processor unit, a writable volatile memory, a read-only, non-volatile and a writable, non-volatile memory, the improvement comprising:

an operating system; contained within the read-only, non-volatile memory and the operating system comprises means for processing a message in accordance with claim 1.

* * * * *